United States Patent [19]

Nozaki et al.

[11] Patent Number: 5,041,299

[45] Date of Patent: Aug. 20, 1991

[54] SPONGE CAKE AND BREAD CONTAINING KONJAK AND METHOD OF MAKING

[75] Inventors: Hisashi Nozaki; Seiya Sakurai, both of Saitama, Japan

[73] Assignees: Kabushikikaisha Kibun, Tokyo; Kabushikikaisha Kyowashokuhin, Saitama, both of Japan

[21] Appl. No.: 382,503

[22] Filed: Jul. 19, 1989

[30] Foreign Application Priority Data

Jul. 22, 1988 [JP]  Japan ................. 63-181653

[51] Int. Cl.⁵ .................... A21D 2/00; A21D 10/00
[52] U.S. Cl. .................... 426/549; 426/496; 426/573; 426/578
[58] Field of Search ............... 426/549, 573, 578, 496, 426/504

[56] References Cited

U.S. PATENT DOCUMENTS

| | | | |
|---|---|---|---|
| 4,676,976 | 6/1987 | Toba et al. | 426/654 |
| 4,741,907 | 5/1988 | Furuhashi | 426/90 |
| 4,746,528 | 5/1988 | Prest et al. | 426/573 |
| 4,963,383 | 10/1990 | Nozaki et al. | 426/573 |

FOREIGN PATENT DOCUMENTS

| | | |
|---|---|---|
| 62-14751 | 1/1987 | Japan . |
| 62-74255 | 4/1987 | Japan . |
| 62-74256 | 4/1987 | Japan . |
| 62-83855 | 4/1987 | Japan . |
| 88/03760 | 6/1988 | PCT Int'l Appl. . |
| 2100967 | 7/1982 | United Kingdom . |
| 2204474 | 11/1988 | United Kingdom . |
| 2206027 | 12/1988 | United Kingdom . |

*Primary Examiner*—Donald E. Czaja
*Assistant Examiner*—D. Workman
*Attorney, Agent, or Firm*—Browdy and Neimark

[57] ABSTRACT

This invention relates to sponge cake and bread prepared by the addition of konjak jelly, i.e. konjak thickened gel, and baking. The product according to the present invention is resistant to dryness and is capable of retaining moistness for a long period.

8 Claims, No Drawings

SPONGE CAKE AND BREAD CONTAINING KONJAK AND METHOD OF MAKING

FIELD OF THE INVENTION

This invention relates to sponge cake and bread. More specifically, the invention relates to sponge cake and bread which are dryness-resistant to retain moistness for a long period.

Generally, sponge cake such as Christmas cake kept under freezing conditions is liable to be dried up so that it loses moistness and its quality is greatly deteriorated; one often finds bread drying under refrigeration. The invention provides sponge cake and bread which keep their moistness for a long period, even if they are stored under freeze and refrigeration and at room temperature. Therefore the invention is very useful in the industries of confectionary and bakery.

PRIOR ART

In order to enhance the moistness of sponge cake, there have been conventionally used a great amount of butter and shortening and the addition of sugar such as glucose and sorbitol has been known as well.

PROBLEMS TO BE SOLVED BY THE INVENTION

Sponge cake, commonly used as a basis for Christmas cake and decoration cake, is prepared long before use and therefore it is likely to be kept in freezers and the like for long hours.

However, sponge cake kept under freeze for long hours loses its moisture so that it gets dry and crisp.

One also encounters dry and crisp bread in a relatively short period when it is kept at room temperature.

MEANS FOR SOLVING THE PROBLEMS

After the long intensive efforts to investigate the means for retaining moistness of sponge cake and bread for a long term, the inventors found that konjak material in a jelly like form, i.e., the form of a thermally-irreversible thickened gel, added to sponge cake and bread is capable of retaining the moisture thereof for a long period.

Thus, the invention relates to sponge cake and bread, prepared by the addition of konjak jelly or thickened gel and baking.

The sponge cake in accordance with the invention is prepared with common raw materials therefor, with the exception of the konjak jelly or thickened gel added at the mixing stage of raw materials.

That is, common sponge cake is prepared by using egg, sugar and flour as main raw materials and by adding butter, shortening and honey thereto, followed by mixing and baking.

Various kinds of bread according to the invention are prepared by the general methods, except the addition of konjak jelly or thickened gel at the mixing stage of raw materials. Konjak jelly or thickened gel used in the invention is prepared in the following method.

For the preparation of konjak jelly, water is added to konjak powder to swell and dissolve the konjak powder, followed by the addition and mixing of basic amino acid, basic salt or the mixture of the two; or water to which basic amino acid, basic salt or the mixture of the two has previously been added and mixed, is added to konjak powder; or konjak powder is previously mixed with basic amino acid, basic salt or the mixture of the two and to this resulting konjak mixture is added water for swelling and dissolving. The mixing is by heating and cooling.

Konjak powder used herein may be Amorphophallus konjak K. Koch, a dried and ground form thereof or a purified form thereof.

Basic amino acids generally include arginine, histidine, lysine, citrulline, ornithine or the like, or the mixture thereof; arginine or lysine is the most preferable. The preferable amount of basic amino acid used is 1.25–15% by weight to konjak powder.

The use of basic amino acid makes it possible to utilize the high pH-buffering potential of basic amino acid so that pH is stabilized to yield a thickened gel, with stabilized quality; moreover, it is advantageous to yield a tasty basic thickened gel without alkaline taste.

Basic salts include organic-acid salts such as sodium citrate, sodium tartrate, sodium malate, sodium acetate, sodium lactate, sodium succinate and the like; phosphate such as sodium polyphosphate, sodium pyrophosphate, sodium metaphosphate, di- or tripotassium phosphate and the like; carbonate such as sodium carbonate, sodium bicarbonate, potassium carbonate, calcium carbonate, magnesium carbonate and the like; sulfate such as potassium sulfate, sodium sulfate, calcium sulfate, magnesium sulfate and the like, and sodium hydroxide, potassium hydroxide and the like or the mixture thereof. As is seen in these examples, any basic salt for food may be used as a basic salt in accordance with the invention.

A combination of acids or acidic salts with buffering potential may be also used, its final pH being basic. The acids and basic salts in that case include citric acid, tartaric acid, malic acid, acetic acid, lactic acid, phosphoric acid, monosodium phosphate, monopotassium phosphate and the like. The amount thereof used is preferably 0.01–5% by weight to that of konjak powder.

Because basic amino acids have high buffering potential to stabilize pH whereas setting the desired pH is very difficult, and because basic salts have low buffering potential whereas the selection of substances makes the desired pH possible, the combined use of basic amino acids and basic salts is capable of setting a desired pH readily and depressing pH fluctuation caused by raw material and water used, so that homogeneous konjak jelly or thickened gel can prepared.

The konjak jelly or thickened gel is different from so called konjak paste which is prepared by swelling konjak powder in water. It is also different from the traditional konjak firm gel which is obtained by adding base to konjak powder and heating the mixture. The konjak jelly or thickened gel has the intermediate property between the two.

The konjak jelly or thickened gel is also different from konjak paste in its property that its heating during the processing of the additive foods causes its complete gellation.

The preparation of konjak jelly or thickened gel will be explained in detail in the following.

In the first stage, konjak powder is swelled and dissolved in 20–40 fold of water. To this konjak-paste-like product is added a basic amino acid, a basic salt or the mixture thereof for extensive mixing. Otherwise, a basic amino acid, a basic salt or the mixture of the two is mixed with water of 20–40 fold that of konjak powder for dissolution, and konjak powder is swelled and dissolved using the resulting solution. As other means, basic amino acid, basic salts or the mixture of the two is mixed with konjak powder prior to the addition and mixing of water 20-40 fold that of konjak powder for swelling and dissolution; the swelled and dissolved konjak paste is heated under alkaline condition followed by cooling to give the objective konjak jelly or thickened gel.

The temperature and period for heating may be adjusted depending on the concentration of salts used, pH and the nature of the resultant konjak jelly or thickened gel. In the case of higher pH of konjak paste, the time for heating may be short, while it gets longer in the case of lower pH thereof.

The konjak jelly or thickened gel should be heated under alkaline condition and it is preferable, to adjust pH at heating so that pH of konjak jelly or thickened gel obtained after cooling is in the range of 8.0 to 10.5, preferably 8.2 after to 10.0.

The conditions for heating are selected from the temperature in the range of 60°-95° C. and the time in the range of 5-210 min.

A preferable combination of pH, the and time is selected so that the konjak jelly or thickened gel obtained after cooling has pH between 8.0 and 10.5, preferably between 8.2 and 10.0, therefore, an optimum combination of conditions should be preferably determined in preliminary experiments.

The heating should be finished before the gellation of konjak paste. When exceeding the optimum heating condition, the konjak paste turns into a firm gel and it loses the mixing ability with other components, a feature of the konjak jelly or thickened gel according to the invention. Furthermore, heating at low temperature can not give the capability of gellation to konjak paste even by reheating and it remains paste-like state. Thus, that state will be the same as konjak paste simply swelling in water.

It is necessary to rapidly cool those after the completion of heating in order to cease the reaction; without this procedure the konjak paste sets into a firm gel. The konjak jelly or thickened gel obtained has pH of 8.0 to 10.5, preferably 8.2 to 10.0. If it has pH exceeding 10.5, it gets into the common konjak and therefore, it may be difficult to mix with other foods; below pH 8.0, it is not solidified, keeping its paste state and as a result, the value of its product will be lowered unfavorably.

The konjak jelly or thickened gel obtained herein has such suitable viscosity and hardness that it can be mixed with various materials at the preparation of sponge cake and bread.

As for the mixing ratio of konjak jelly or thickened gel to the raw materials for sponge cake and bread, there may be used the lowest one that can give moistness to cake and bread or the highest one just before giving an extraneous taste. The mixing ratio is 0.1-50%, preferably 2-20%, and more preferably about 3 15%.

This invention provides moist and wet sponge cake and bread by the addition of konjak jelly or thickened gel and these are not easily dried, even if preserved under freeze and refrigeration and at room temperature. Thus, they can retain moistness for a considerable long period.

Experimental examples and examples are shown in the following.

EXPERIMENTAL EXAMPLE

Sugar (120 g) is added to four eggs to beat well. After whipping sufficiently, a little bit of vanilla extract is added and previously sifted weak flour (120 g) divided in several portions is added to mix well. The resulting mixture called (A) is poured into cake pan and baked in an oven (150° C.) for 40 min. To (A) is added butter (60 g) melted in a pan and the resulting mixture is called (B), which is also baked in the same way. To (A) is added konjak jelly or thickened gel (60 g) diluted twofold with water and the resulting mixture is called (C), the konjak jelly or thickened gel being prepared by adding 0.5% sodium carbonate to konjak powder (28 g) for swelling followed by heating at 70° C. for 30 min. and cooling. (C) is also baked in the same fashion.

Each sponge cake, after refrigeration overnight, is tasted by panel members to compare the moistness and to point out the sponge cake with the greatest moistness. The result is shown in the following table.

| The result of panel test | |
|---|---|
| (A) | 0 |
| (B) | 1 |
| (C) | 19 |

EXAMPLE 1

Sugar (120 g) is added to four eggs to beat well. After whipping sufficiently, a little bit of vanilla extract is added and previously sifted flour (120 g) is added to mix well. To the resulting mixture is added butter (60 g) melted in a pan and konjak jelly or thickened gel (60 g) diluted twofold with water, used in experimental example, to mix well. The resulting mixture is poured into cake pan and baked in an oven (160° C.) for 35 min. The pound cake with moist taste is obtained.

EXAMPLE 2

Four eggs are divided in egg white and egg yolk. Eggwhite is beaten well with beater To egg yolk is added sugar (150 g) and honey (50 g) to knead well and the resulting dough is added to the whipped egg white. To this is added flour (100 g) to mix well and 50 g of konjak jelly or thickened gel, used in experimental example, two-fold diluted with water and the resulting mixture is poured into cake pan lined with paper and baked at 140° C. for 60 min. The baked castella has moist taste.

EXAMPLE 3

Flour (strong type; 250 g), skim milk (5 g), butter (15 g), sugar (15 g), salt (4 g), dry yeast (3 g), konjak jelly or thickened gel (30 g) used in experimental example and water (170 ml) are poured into Hitachi Home Bakery, followed by kneading, fermentation and baking to prepare bread.

Using the same materials except water (200 ml) instead of konjak thickened gel, bread is prepared in the same manner. Bread prepared using konjak thickened gel is more moist than that without konjak thickened gel and thus, after stored at room temperature for 3 days, bread with konjak thickened gel is more moist than that without konjak thickened gel and it is not hard.

What is claimed is:
1. A process for producing sponge cake or bread, said process comprising the steps of:
 (a) forming a konjak paste by mixing components consisting essentially of konjak flour, a sufficient amount of water to cause the konjak flour to swell and dissolve, and a basic amino acid, a basic salt, or mixture thereof;

(b) heating said konjak paste under weak alkaline conditions at a temperature and time sufficient to begin the setting of said konjak paste, said temperature being about 60° C. or more, to thereby begin setting of said konjak paste;

(c) prior to completion of setting of said heated konjak paste, rapidly cooling the heated paste and thus stopping said setting prior to essential completion of said setting of said konjak paste into a firm gel;

(d) mixing the resulting thermally-irreversible konjak thickened gel in an amount sufficient to improve moisture retention with raw materials for cake or bread; and (e) then, baking the mixture of (d).

2. A baked food product prepared by the addition of an amount sufficient to improve moisture retention of a thermally-irreversible konjak thickened gel to raw materials including flour for making cake and bread products, followed by baking the resultant mixture, said thermally-irreversible konjak thickened gel being obtainable by:

(a) forming a konjak paste by mixing components consisting essentially of konjak flour, a sufficient amount of water to cause the konjak flour to swell and dissolve, and a basic amino acid, a basic salt, or mixture thereof;

(b) heating said konjak paste under weak alkaline conditions at a temperature and time sufficient to begin the setting of said konjak paste, said temperature being about 60° C. or more, to thereby begin setting of said konjak paste;

(c) prior to completion of setting of said heated konjak paste, rapidly cooling the heated paste and thus stopping said setting prior to essential completion of said setting of said konjak paste into a firm gel.

3. A baked food product according to claim 2 containing, on a solids basis, 2–20% of said konjak thickened gel.

4. A baked food product according to claim 2 containing, on a solids basis, 3–15% of said konjak thickened gel.

5. Sponge cake according to claim 4.

6. Bread according to claim 4.

7. A baked food product according to claim 2 wherein said konjak thickened gel comprises the sole gelatinous material in said baked food product.

8. A baked food product according to claim 3 containing a gelatinous material which consists essentially of said konjak thickened gel.

* * * * *